US012570855B2

(12) United States Patent
Zampella et al.

(10) Patent No.: US 12,570,855 B2
(45) Date of Patent: Mar. 10, 2026

(54) NON-SAG COMPOSITION

(71) Applicant: Momentive Performance Materials Inc., Waterford, NY (US)

(72) Inventors: Joseph Zampella, Waterford, NY (US); David Gascoyne, Waterford, NY (US); Clarissa Miller, Waterford, NY (US); Vinodh Rajendra, Ballston Spa, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 686 days.

(21) Appl. No.: 17/941,077

(22) Filed: Sep. 9, 2022

(65) Prior Publication Data

US 2023/0083453 A1 Mar. 16, 2023

Related U.S. Application Data

(60) Provisional application No. 63/242,276, filed on Sep. 9, 2021.

(51) Int. Cl.
| | |
|---|---|
| *C08L 83/04* | (2006.01) |
| *C08G 77/16* | (2006.01) |
| *C08G 77/20* | (2006.01) |
| *C08K 3/22* | (2006.01) |

(52) U.S. Cl.
CPC .............. *C08L 83/04* (2013.01); *C08G 77/16* (2013.01); *C08G 77/20* (2013.01); *C08K 2003/2265* (2013.01); *C08L 2205/02* (2013.01)

(58) Field of Classification Search
None
See application file for complete search history.

(56) References Cited

U.S. PATENT DOCUMENTS

| | | | | |
|---|---|---|---|---|
| 10,808,154 B2 * | 10/2020 | Gubbels | ................ | C09J 183/06 |
| 2007/0237912 A1 | 10/2007 | Correia | | |
| 2007/0244429 A1 * | 10/2007 | Nguyen | ........... | A61B 17/00008 604/89 |
| 2017/0009098 A1 * | 1/2017 | Huda | ........................ | C09D 5/00 |

FOREIGN PATENT DOCUMENTS

| | | | | | |
|---|---|---|---|---|---|
| CN | 102167965 | * | 8/2011 | .............. | C08L 83/04 |
| CN | 109777347 | | 5/2019 | | |
| WO | 2008153983 | | 12/2008 | | |
| WO | WO-2019027897 A1 | * | 2/2019 | ............. | C08G 77/08 |
| WO | WO-2019190776 A1 | * | 10/2019 | ............. | C08L 83/04 |
| WO | WO-2020117719 A1 | * | 6/2020 | ............. | C08G 77/14 |

OTHER PUBLICATIONS

Machine translation of CN 102217965 (no date).*
Patent Cooperation Treaty (PCT), International Search Report and Written Opinion for Application PCT/US2022/042979 filed Sep. 9, 2022, mailed Dec. 16, 2022, International Searching Authority, EP.

* cited by examiner

*Primary Examiner* — Marc S Zimmer

(74) *Attorney, Agent, or Firm* — Joseph Waters; McDonald Hopkins LLC

(57) ABSTRACT

A room temperature vulcanizable composition is shown and described herein. The composition is curable at room temperature and exhibits non-sagging properties that allow the composition to be employed in a variety of applications including both horizontal and vertical joints.

28 Claims, No Drawings

NON-SAG COMPOSITION

CROSS-REFERENCE TO RELATED APPLICATIONS

The present application claims priority to and the benefit of U.S. Provisional Application No. 63/242,276 titled "NON-SAG COMPOSITION," filed on Sep. 9, 2021, the disclosure of which is incorporated herein by reference in its entirety.

FIELD OF INVENTION

The present invention relates to a room temperature vulcanizable composition. In particular, the present invention relates to a room temperature vulcanizable composition that exhibits non-sag properties at substantially large thickness applications. Also provided is a method of using the compositions for adhering or sealing surfaces.

BACKGROUND

Some room temperature vulcanizable (RTV) compositions can be used as adhesives or sealants in a variety of applications. One use for RTV sealants is to seal joints, for example construction joints. The sealants may be required to be able to seal a variety of construction joints of varying geometries and configurations, and preferred sealants in the industry are those that are able to seal joints in as many situations as possible. Sealants generally need a variety of physical properties in order to maintain a seal subsequent to curing in place. For example, construction joints and, therefore, the sealants sealing them are generally subjected to movement, which may be caused, for example, by thermal expansion or shrinkage of the substrates forming the joints. In order to cope with this repeated movement, a sealant needs to have a degree of elasticity. The elasticity of a sealant may be determined from several physical properties such as elongation at break (maximum elongation), modulus at 100% elongation, and tensile strength. While unfilled silicone elastomers can show very high elongations at break of more than 500%, their modulus, tensile strength, hardness, and tear resistance are too low for the cured sealant to function successfully in sealing construction applications. In order to improve the overall elastic characteristics of such sealants to render them functional for sealing construction joints, reinforcing fillers need to be added to the formulation.

Flowable sealants are often used in horizontal applications such as highway joints. Other applications, such as many construction applications, however, require the sealant to have sufficient sag control in the uncured state in order to enable uncured sealant compositions to be applied to and/or in overhead crevices and wall crevices. Such joints are typically referred to as vertical joints. In these vertical applications, the sealant must remain in the area as applied or subsequent to working without flowing out of the crevice, until it cures to form a silicone elastomeric seal. Sag-control generally refers to the state in which the composition in the uncured state is extrudable and flowable but when only subjected to the forces of gravity and the applied uncured sealant composition will stay where applied without flowing before it cures to an elastomeric body. Thus, sag-control is an important property for silicone sealants used in the construction industry for sealing, in particular vertical joints. In particular, the sealants for vertical applications need to exhibit non-sag properties.

While generally the "sag" of sealants may be reduced by the addition of large amounts of fillers (reinforcing or non-reinforcing), or non-sag additives, the sealants still need to be extrudable in the uncured state in order to be applied on to a vertical joint. Furthermore, the amounts of filler required to provide non-sag properties in a silicone sealant formulation can lead to poor mechanical properties in particular low elongation.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Provided is a two-part room temperature vulcanizable (RTV) composition suitable for use as an adhesive or sealant in applications requiring non-sag properties. The present compositions provide a low viscosity material that is suitable for high throughput dispensing and mixing and exhibits suitable non-sag properties prior to curing at desirable thicknesses for vertical applications.

The present compositions have surprisingly been found to be flowable to allow for high speed mixing and dispensing, and exhibit non-sag properties at substantial thicknesses to allow the compositions to be used in vertical applications.

The present compositions comprises two-parts that when combined are sufficiently non-flowable to allow for high throughput dispensing yet exhibit non-sag properties prior to curing that allow the composition to be used in vertical applications.

In one embodiment, the compositions, upon curing, are non-sag from about 60 mil to about 235 mil (from about 0.06 inches to about 0.235 inches).

In one aspect, provided is a t wo-part room temperature vulcanizable composition comprising: (a) a first part comprising (i) a polysiloxane polymer having a reactive group, (ii) a filler, and (iii) optionally water; and (b) a second part comprising (i) a polysiloxane polymer that may or may not react with a condensation cure silicone system and (ii) a filler and (iii) a tin catalyst.

In one embodiment, the first part has a viscosity at 25° C. and a shear rate of $10 \text{ s}^{-1}$ (plate-plate system, plate diameter 40 mm, gap width 0.5 mm) of from about 30 to about 300 PaS, and the second part has a viscosity at 25° C. and a shear rate of $10 \text{ s}^{-1}$ (plate-plate system, plate diameter 40 mm, gap width 0.5 mm) of from about 50 to about 300 PaS In one embodiment in accordance with any of the previous embodiments, the tin catalyst comprises a mixture of silica and a tin compound. In one embodiment, the tin compound is selected from a dialkyltin dicarboxylate.

In one embodiment in accordance with any of the previous embodiments, the tin compound is present in an amount of from about 0.1 weight percent to about 6 weight percent based on the total weight of the second part.

In one embodiment in accordance with any of the previous embodiments, wherein the polymer siloxane (i) of the first part is a silanol-terminated polysiloxane.

In one embodiment in accordance with any of the previous embodiments, the silanol-terminated polysiloxane silanol-terminated is a diorganopolysiloxane polymer of the formula:

$$M^1{}_a D^1{}_b D^2{}_c$$

where:

$M^1$ is $(HO)_{3-x-y}R^1{}_xR^2{}_ySiO_{1/2}$ $D^1=R^3R^4SiO_{2/2}$ $D^2=R^5R^6SiO_{2/2}$ where $R^1$ and $R^2$ are independently chosen monovalent hydrocarbon radicals up to about 60 carbon atoms; $R^3$ and $R^4$ are independently chosen monovalent hydrocarbon radicals of up to about 60 carbon atoms; where $R^5$ and $R^6$ are independently chosen monovalent hydrocarbon radicals of up to about 60 carbon atoms; a is 2, b is equal to or greater than 1, c zero or positive integer, x is 0, 1, or 2, and y is either 0 or 1, subject to the limitation that x+y is less than or equal to 2.

In one embodiment, the silanol-terminated polysiloxane is a dimethyldiphenylpolysiloxane.

In one embodiment in accordance with any of the previous embodiments, the polysiloxane polymer (i) of the second part is an alkenyl-terminated polysiloxane.

In one embodiment in accordance with any of the previous embodiments, the polysiloxane polymer (i) of the second part is a vinyl-terminated polysiloxane.

In one embodiment in accordance with any of the previous embodiments, the polysiloxane (i) of the second part is of the formula:

$$M^2{}_dD^3{}_eD^4{}_f$$

where $M^2=(R^{11})(R^{12})(R^{13})SiO_{1/2}$;

$D^3=R^{14}R^{15}SiO_{2/2}$;

$D^4=R^{16}R^{17}SiO_{2/2}$;

where $R^{11}$, $R^{12}$, and $R^{13}$ are independently chosen from a hydrocarbon up to about 60 carbon atoms and can have a reactive or an unreactive group; $R^{14}$ and $R^{15}$ are independently chosen from a hydrocarbon of up to about 60 carbon atoms; $R^{16}$ and $R^{17}$ are independently chosen from a of up hydrocarbon to about 60 carbon atoms; subscript d is 2, e is equal to or greater than 1, and f is zero or a positive integer; at least one of $R^{11}$, $R^{12}$, $R^{13}$, $R^{14}$, $R^{15}$, $R^{16}$, and $R^{17}$ is a group optionally comprising a reactive group or an unreactive group.

In one embodiment, at least one of $R^{11}$, $R^{12}$, $R^{13}$, $R^{14}$, $R^{15}$, $R^{16}$, and $R^{17}$ is an alkenyl functional group.

In one embodiment in accordance with any of the previous embodiments, the filler is present in an amount of from about 35 wt. % to about 60 wt. % based on the total weight of the vulcanizable composition.

In one embodiment in accordance with any of the previous embodiments, the composition comprises a silanol functional polyorganosiloxane having a silanol content of at least about 5% by weight based on the weight of the silanol functional polyorganosiloxane.

In one embodiment, the silanol functional polyorganosiloxane is of the formula:

$$M^3{}_gD^5{}_hD^6{}_i$$

where $M^3=(R^{18})(R^{19})(R^{20})SiO_{1/2}$;

$D^5=R^{21}R^{22}SiO_{2/2}$;

$D^6=R^{23}R^{24}SiO_{2/2}$;

where $R^{18}$, $R^{19}$, $R^{20}$, $R^{21}$, $R^{22}$, $R^{23}$, and $R^{24}$ are independently chosen from a hydrocarbon of up to about 60 carbon atoms, and a hydroxyl group; subscript g is 2, h is equal to or greater than 1, and i is zero or a positive integer; and the silanol functional polyorganosiloxane has a silanol content of at least 5%.

In one embodiment in accordance with any of the previous embodiments, h+i is from about 5 to about 2,500.

In one embodiment in accordance with any of the previous embodiments, the silanol functional polyorganosiloxane has a silanol content of from about 5% to about 10% based on the weight of the silanol functional polyorganosiloxane. In one embodiment, the silanol functional polyorganosiloxane has a silanol content of from about 5% to about 10% by weight, from about 5.5% to about 9.5% by weight, from about 6% to about 8% by weight, or from about 6.5% to about 7% by weight based on the weight of the silanol functional polyorganosiloxane.

In one embodiment in accordance with any of the previous embodiments, the silanol functional polyorganosiloxane is present in the first or second part and is present in an amount of from about 0.05 wt. % to about 1 wt. % based on the total weight of the part to which it is added.

In one embodiment in accordance with any of the previous embodiments, the silanol functional polyorganosiloxane is present in the first part.

In one embodiment in accordance with any of the previous embodiments, the ratio of the first part to the second part is from about 10:0.7 to about 10:1 by weight.

In one embodiment in accordance with any of the previous embodiments, the ratio of the first part to the second part is from about 10:0.75 to about 10:0.95 by weight.

In one embodiment in accordance with any of the previous embodiments, upon mixing and curing the first part with the second part, the composition is non-sagging at from about 60 mil to about 235 mil.

In another aspect, provided is a cured material formed from a mixture of the room temperature vulcanizable composition of any of the previous aspects or embodiments.

In a further aspect, provided is a method of treating a surface comprising applying a mixture of the first part and the second part of the two-part vulcanizable composition of any of the previous aspects or embodiments.

In one embodiment of the method, the ratio of the first part to the second part is from about 10:0.7 to about 10:1 by weight. In one embodiment of the method, the ratio of the first part to the second part is from about 10:0.75 to about 10:0.95 by weight.

The following description and the drawings disclose various illustrative aspects. Some improvements and novel aspects may be expressly identified, while others may be apparent from the description and drawings.

DETAILED DESCRIPTION

Reference will now be made to exemplary embodiments, examples of which are illustrated in the accompanying detailed description. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The present composition is a two-part room temperature vulcanizable composition. The compositions comprises a silicone polymer that is curable upon exposure to moisture. In one embodiment, the composition, upon mixing of the two-parts and exposing to moisture cures at a temperature of from about 5° C. to about 50° C. The composition, in one part, includes a tin paste catalyst. The use of the tin paste catalyst and mixing the respected parts at a desired ratio provides a room temperature curable composition that exhibits non-sag properties at substantial coating or application thicknesses.

In one embodiment, the composition comprises a first part (Part A) and a second part (Part B), where the first part includes a silicone polymer, one or more fillers, a cross-linker, and optionally water, and the second part includes a silicone polymer, a tin catalyst, and a filler. The catalyst is compounded with the filler in the second part such that the second part is provided as a paste. The composition optionally includes other materials such as fillers, pigments, adhesion promoters, and other additives as are known or generally used in such sealant and adhesive compositions. In one embodiment, the second part includes a pigment and an adhesion promoter.

First Part (Part A)

The first part includes a silicone polymer with a group that is reactive to protic agent such as water. The silicone polymer may be a polymer with a reactive group selected from OH, alkoxy, alkenyloxy, alkyloximo, alkylcarboxy, arylcarboxy, or a combination of two or more thereof. In one embodiment, the silicone polymer is a polysiloxane polymer comprising a reactive group. In one embodiment, the first part comprises a silanol-terminated diorganopolysiloxane.

In one embodiment, the silanol-terminated diorganopolysiloxane polymer of the is of the general formula:

$$M^1{}_aD^1{}_bD^2{}_c$$

$M^1$ is $(HO)_{3-x-y}R^1{}_xR^2{}_ySiO_{1/2}$
$D^1=R^3R^4SiO_{2/2}$
$D^2=R^5R^6SiO_{2/2}$
where $R^1$ and $R^2$ are independently chosen monovalent hydrocarbon radicals up to about 60 carbon atoms;
$R^3$ and $R^4$ are independently chosen monovalent hydrocarbon radicals of up to about 60 carbon atoms; where
$R^5$ and $R^6$ are independently chosen monovalent hydrocarbon radicals of up to about 60 carbon atoms;
a is 2, b is equal to or greater than 1, c zero or positive integer, x is 0, 1, or 2, and y is either 0 or 1, subject to the limitation that x+y is less than or equal to 2.

In one embodiment, $R^1$, $R^2$, $R^3$, $R^4$, $R^5$, and $R^6$ are each independently chosen from a C1-C10 alkyl and a C6-C30 aryl. In one embodiment, $R^1$, $R^2$, $R^3$, $R^4$, $R^5$, and $R^6$ are each independently selected from methyl, ethyl, propyl, isopropyl, butyl, isobutyl, tert-butyl, phenyl, and tolyl. In an exemplary embodiment, the silicone polymer is a silanol terminated dimethyldiphenylsiloxane.

In one embodiment of the present invention, the silicone polymer is provided in an amount of from about 5 weight percent to about 95 weight percent, from about 35 weight percent to about 85 weight percent, or from about 50 weight percent to about 70 weight percent of the total composition.

According to one embodiment of the present invention, the viscosity of the polysiloxane polymer in the first part is from about 2.5 to about 20 PaS, from about 4 to about 16

PaS, from about 5 to about 12 PaS, or from about 7.5 to about 10 PaS at 25° C. Viscosity is evaluated by an Ostwald viscometer tube (based on ASTM D445).

The first part may further include one or more fillers. Examples of suitable fillers include, but are not limited to, crushed quartz, diatomaceous earth, barium sulphate, iron oxide, titanium dioxide, carbon black, talc, cristobalite, mica, feldspar, wollastonite, fumed silica, treated fumed silica, aluminite, calcium sulphate (anhydrite), gypsum, aluminum trihydroxide, magnesium hydroxide (brucite), graphite, aluminum oxide, or silicates from the group consisting of the olivine group, the garnet group, aluminosilicates, ring silicates, chain silicates and sheet silicates, or plastic or glass microspheres, preferably hollow microspheres. The filler can be present, for example, in an amount of from at 35 weight percent to about 60 weight percent, from about 40 weight percent to about 55 weight percent, or from about 45 to about 50 weight percent based on the total weight of the composition. The fillers are provided with proviso that the introduction of the filler does not negatively affect the physical properties of the uncured sealant composition (e.g. sag) or the subsequently cured product (e.g. elongation at break).

The first part may also include a crosslinker. In one embodiment, the crosslinker or chain extender may be chosen from an alkoxysilane, an alkoxysiloxane, an oximosilane, an oximosiloxane, an enoxysilane, an enoxysiloxane, an aminosilane, an aminosiloxane, a carboxysilane, a carboxysiloxane, an alkylamidosilane, an alkylamidosiloxane, an arylamidosilane, an arylamidosiloxane, an alkoxyaminosilane, an alkylarylaminosiloxane, an alkoxycarbamatosilane, an alkoxycarbamatosiloxane, an imidatosilane, a ureidosilane, an isocyanatosilane, a isothiocyanatosilane, the condensates thereof and combinations of two or more thereof.

In one embodiment, the crosslinker is selected from an alkoxy silane. In one embodiment, the alkyl silicate is of the formula:

$$(R^7O)(R^8O)(R^9O)(R^{10}O)Si$$

where $R^7$, $R^8$, $R^9$, and $R^{10}$ are independently chosen monovalent hydrocarbon radicals up to about 60 carbon atoms. In one embodiment, $R^7$, $R^8$, $R^9$, and $R^{10}$ are each independently chosen from a C1-C10 alkyl and a C6-C30 aryl.

Examples of suitable cross-linkers include, but are not limited to, tetraethylorthosilicate (TEOS); methyltrimethoxysilane (MTMS); methyltriethoxysilane; vinyltrimethoxysilane; vinyltriethoxysilane; methylphenyldimethoxysilane; 3,3,3-trifluoropropyltrimethoxysilane; methyltriacetoxysilane; vinyltriacetoxysilane; ethyltriacetoxysilane; di-butoxydiacetoxysilane; phenyltripropionoxysilane; methyltris(methylethylketoximo)silane; vinyltris(methylethylketoximo)silane; 3,3,3-trifluoropropyltris(methylethylketoximo)silane; methyltris(isopropenoxy)silane; vinyltris(isopropenoxy)silane; ethylpolysilicate; dimethyltetraacetoxydisiloxane; tetra-n-propylorthosilicate; methyldimethoxy(ethylmethylketoximo)silane; methylmethoxybis(ethylmethylketoximo)silane; methyldimethoxy(acetaldoxime)silane; methyldimethoxy(N-methylcarbamato)silane; ethyldimethoxy(N-methylcarbamato)silane; methyl dimethoxyisopropenoxysilane; trimethoxyisopropenoxysilane; methyltriisopropenoxysilane; methyldimethoxy(but-2-en-2-oxy)silane; methyl dimethoxy(1-phenylethenoxy)silane; methyldimethoxy-2-(1-carboethoxypropenoxy)silane; methylmethoxydi(N-methylamino)silane; vinyldimethoxy(methylamino) silane; tetra-N,N-diethylaminosilane; methyldimethoxy(methylamino)silane; methyltri(cyclohexylamino)silane; methyl dimethoxy(ethyl amino)silane; dimethyldi(N,N-di methyl-amino)silane; methyl dimethoxy(isopropylamino)silane; dimethyldi(N,N-diethylamino)silane; ethyldimethoxy(N-ethylpropionamido)silane; methyldimethoxy(N-methylacet-amido)silane; methyltris(N-methylacetamido)silane; ethyl-dimethoxy(N-methylacetamido)silane; methyltris(N-methylbenzamido)silane; methylmethoxybis(N-methylacetamido)silane; methyldimethoxy(caprolactamo) silane; trimethoxy(N-methylacetamido)silane; methyldimethoxy(ethylacetimidato)silane; methyldime-thoxy(propylacetimidato)silane; methyldimethoxy(N,N',N'-trimethylureido)silane; methyldimethoxy(N-allyl-N',N'-di-methylureido)silane; methyldimethoxy(N-phenyl-N',N'-dimethylureido)silane; methyldimethoxyisocyanatosilane; dimethoxydiisocyanatosilane; methyldimethoxyisothiocya-natosilane; methylmethoxydiisothiocyanatosilane, the con-densates thereof, or combinations of two or more thereof.

According to one embodiment of the present invention, the crosslinker is present in an amount of from about 0.01 weight percent to about 20 weight percent, from about 0.1 weight percent to about 15 weight percent, from about 0.2 weight percent to about 10 weight percent, and from about 0.3 weight percent to about 5 weight percent based on the total weight of the composition. In yet another embodiment, the adhesion promoter ranges from about 0.5 weight percent to about 1.5 weight percent of the total composition.

The composition may optionally include a silanol inhibi-tor. The silanol inhibitor may be selected from a short-chain silanol functional polyorganosiloxane having a silanol con-tent of at least 5% by weight based on the weight of the short-chain silanol functional polyorganosiloxane. The short-chain silanol functional polyorganosiloxane may also be referred to here in as a silanol functional polyorganosi-loxane. In one embodiment, the silanol inhibitor has a silanol content of from about 5% to about 10% by weight based on the weight of the short-chain polyorganosiloxane (i.e., silanol functional polyorganosiloxane).

In one embodiment, the silanol inhibitor is a silanol functional polyorganosiloxane of the formula:

$$M^3_g D^5_h D^6_i$$
$$M^3 = (R^{18})(R^{19})(R^{20})SiO_{1/2};$$
$$D^5 = R^{21}R^{22}SiO_{2/2};$$
$$D^6 = R^{23}R^{24}SiO_{2/2};$$

where $R^{18}$, $R^{19}$, $R^{20}$, $R^{21}$, $R^{22}$, $R^{23}$, and $R^{24}$ are independently chosen from a hydrocarbon of up to about 60 carbon atoms, and a hydroxyl group;

subscript g is 2, h is equal to or greater than 1, and i is zero or a positive integer; and the silanol functional poly-organosiloxane has a silanol content of at least 5% by weight based on the weight of the silanol functional polyorganosiloxane. In one embodiment, h+i is from about 5 to about 2,500, about 10 to about 2,250, about 25 to about 2,000, about 50 to about 1,750, about 75 to about 1,500, about 100 to about 1,000, or about 200 to about 750.

In one embodiment, $R^{18}$, $R^{19}$, $R^{20}$, $R^{21}$, $R^{22}$, $R^{23}$, and $R^{24}$ are each independently selected from a C1-C10 alkyl and a C6-C30 aryl. In one embodiment, $R^{18}$, $R^{19}$, $R^{20}$, $R^{21}$, $R^{22}$, $R^{23}$, and $R^{24}$ are each independently selected from methyl, ethyl, propyl, isopropyl, butyl, isobutyl, tert-butyl, phenyl, and tosyl. In one embodiment, $R^{18}$, $R^{19}$, $R^{20}$, $R^{21}$, $R^{22}$, $R^{23}$, and $R^{24}$ are independently selected from methyl and/or phenyl.

The silanol inhibitor has a silanol content of at least 5% by weight based on the weight of the silanol functional polyorganosiloxane. In one embodiment, the silanol inhibi-tor has a silanol content of from about 5% to about 10% by weight, from about 5.5% to about 9.5% by weight, from about 6% to about 8% by weight, or from about 6.5% to about 7% by weight based on the weight of the silanol functional polyorganosiloxane.

The silanol inhibitor can be added to Part A, Part B, or both Part A and Part B. In one embodiment, the silanol inhibitor is added to either Part A or Part B and is added to that respective part in an amount of from 0 to about 1 wt. %, from about 0.05 wt. % to about 0.95 wt. %, from about 0.1 wt. % to about 0.8 wt. %, from about 0.2 wt. % to about 0.6 wt. %, or from about 0.3 wt. % to about 0.5 wt. % based on the weight of the part to which the silanol inhibitor is added. In one embodiment, the silanol inhibitor is added to Part A.

The first part may be anhydrous or may optionally com-prise a small amount of water to facilitate the initial reaction upon mixing with the second part. In one embodiment, the first part may comprise water in an amount of from about 0.05 weight percent to about 0.5 weight percent, from about 0.1 weight percent to about 0.4 weight percent, or from about 0.2 to about 0.3 weight percent based on the total weight of the first part.

In one embodiment, the first part of the two-part compo-sition may have a viscosity at 25° C., and a shear rate of 10 $s^{-1}$ (plate-plate system, plate diameter 40 mm, gap width 0.5 mm) of from about 30 to about 300 PaS, from about 35 to about 200, from about 40 to about 100, or from about 50 to about 80 PaS.

Second Part (Part B)

The second part of the two-part composition comprises a silicone polymer, a catalyst, and a filler. The second part is provided such that the catalyst is compounded with a filler such that the second-part is provided as a paste.

The silicone polymer of the second part includes a poly-siloxane polymer that will not react with a condensation cure silicone system. In one embodiment, the silicone in the second part can include a reactive group selected from OH, alkoxy, alkenyloxy, alkyloximo, alkylcarboxy, arylcarboxy, or a combination of two or more thereof. In one embodi-ment, the silicone polymer in the second part is a polysi-loxane polymer.

In one embodiment, the second part comprises a polysi-loxane polymer of the formula:

$$M^2_d D^3_e D^4_f$$
$$M^2 = (R^{11})(R^{12})(R^{13})SiO_{1/2};$$
$$D^3 = R^{14}R^{15}SiO_{2/2};$$
$$D^4 = R^{16}R^{17}SiO_{2/2};$$

where $R^{11}$, $R^{12}$, and $R^{13}$ are independently chosen from a hydrocarbon of up to about 60 carbon atoms and could have reactive or unreactive groups;

$R^{14}$ and $R^{15}$ are independently chosen from a hydrocarbon of up to about 60 carbon atoms;

$R^{16}$ and $R^{17}$ are independently chosen from a hydrocarbon of up to about 60 carbon atoms; and subscript d is 2, e is equal to or greater than 1, and f is zero or a positive integer;

$R^{11}$, $R^{12}$, $R^{13}$, $R^{14}$, $R^{15}$, $R^{16}$ and $R^{17}$ optionally compris-ing a reactive or an unreactive group.

In one embodiment, $R^{11}$, $R^{12}$, $R^{13}$, $R^{14}$, $R^{15}$, $R^{16}$, and $R^{17}$ are each independently selected from a C1-C10 alkyl and a C6-C30 aryl. In one embodiment, $R^{11}$, $R^{12}$, $R^{13}$, $R^{14}$, $R^{15}$, $R^{16}$, and $R^{17}$ are each independently selected from methyl, ethyl, propyl, isopropyl, butyl, isobutyl, tert-butyl, phenyl, and tosyl.

In one embodiment, the silicone polymer in the second part is selected from an alkenyl functional siloxane. In one embodiment, the siloxane in the second part is selected from a vinyl-terminated siloxane. Examples of suitable siloxanes for the second part include, but are not limited to, vinyl-terminated dimethylsiloxane, vinyl-terminated dimethyldiphenyl siloxane, and the like.

In one embodiment of the present invention, the silicone polymer of the second part is present in an amount of from about 5 weight percent to about 95 weight percent, and from about 35 weight percent to about 85 weight percent in another embodiment, and in yet another embodiment from about 50 weight percent to about 70 weight percent of the total composition.

According to one embodiment of the present invention, the viscosity of the silicone polymer in the second part is from about 1 to about 20 PaS, from about 2.5 to about 18 PaS, from about 5 to about 15 PaS, or from about 7.5 to about 10 PaS at 25° C. Viscosity is evaluated by an Ostwald Viscometer Tube.

The second part of the two-part curable composition comprises a condensation catalyst. In accordance with the present technology, the catalyst is compounded with a filler such that the second part is provided as a paste.

The tin compounds useful for facilitating crosslinking in silicone rubber-forming composition include any tin material suitable for promoting or facilitating crosslinking in rubber-forming compositions. In one embodiment, the tin compounds are selected from dialkyltin dicarboxylates. The alkyl group in the dialkyl tin compound can be selected as desired and in embodiment, is selected from a C1-C10 alkyl such as, but not limited to, methyl, ethyl, propyl, butyl, etc. The carboxylate can be selected as desired and derived from any suitable carboxylic acid. Non-limiting examples of suitable carboxylate groups include acetate, 2-ethylhexanoate, and neodecanoate. Examples of suitable tin compounds include, but are not limited to, dibutyltindilaurate, dibutyltindiacetate, dibutyltindimethoxide, tinoctoate, isobutyltintriceroate, dibutyltinoxide, dibutyltin bis-isooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, dibutyltin di-neodecanoate, triethyltin tartarate, dibutyltin dibenzoate, tin oleate, tin naphthenate, butyltintri-2-ethylhexylhexoate, and tinbutyrate. In one embodiment, the tin catalyst is a paste of dimethyltin di-neodecanoate.

The tin compound can be present in an amount of from about 0.1 weight percent to about 6 weight percent, from about 0.3 weight percent to about 3 weight percent, or from about 0.5 weight percent to about 1.5 weight percent based on the total weigh of the second part.

The second part includes a filler that, when mixed with the catalyst, provides a paste. Examples of suitable fillers include, but are not limited to, crushed quartz, diatomaceous earth, barium sulphate, iron oxide, titanium dioxide, carbon black, talc, crystobalite, mica, feldspar, wollastonite, fumed silica, fumed alumina, aluminite, calcium sulphate (anhydrite), gypsum, aluminum trihydroxide, magnesium hydroxide (brucite), graphite, aluminum oxide, or silicates from the group consisting of the olivine group, the garnet group, aluminosilicates, ring silicates, chain silicates and sheet silicates, or plastic or glass microspheres, preferably hollow microspheres. The filler employed to make the paste is provided in an amount of from at 15 weight percent to about 63 weight percent, from about 20 weight percent to about 35 weight percent, or from about 25 to about 30 weight percent based on the total weight of the second part.

The second part of the two-part composition may have a viscosity at 20° C. and a shear rate of 10 s$^{-1}$ (plate-plate system, plate diameter 40 mm, gap width 0.5 mm) of from about 50 PaS to about 300 PaS, from about 60 PaS to about 250 PaS, from about 70 PaS to about 200 PaS, or from about 80 PaS to about 150 PaS.

The composition may further include an adhesion promoter. In one embodiment, the adhesion promoter is provided in the second part. The adhesion promoter is not particularly limited and can include those described in U.S. Publication No. 2014/0378612, the disclosure of which is incorporated herein by reference in its entirety. Some examples of suitable adhesion promoters include, but are not limited to, N-(2-amino ethyl)aminopropyltrimethoxysilane gamma-aminopropyltriethoxysilane, gamma-aminopropyltrimethoxysilane, bis(gamma-trimethoxysilypropyl)amine, N-phenyl-gamma-aminopropyltrimethoxysilane, triamino-functionaltrimethoxysilane, gamma-aminopropylmethyldimethoxysilane, gamma-aminopropylmethyldiethoxysilane, methacryloxypropyltrimethoxysilane, methylaminopropyltrimethoxysilane, gamma-glycidoxypropylethyldimethoxysilane, gamma-glycidoxypropyltrimethoxysilane, gamma-glycidoxyethyltrimethoxysilane, gamma-(3,4-epoxycyclohexyl)ethyltrimethoxysilane, beta-(3,4-epoxycyclohexyl)ethylmethyl-dimethoxysilane, epoxylimonyltrimethoxysilane, isocyanatopropyltriethoxysilane, isocyanatopropyltrimethoxysilane, isocyanatopropylmethyldimethoxysilane, beta-cyano-ethyl-trim ethoxysilane, gamma-acryloxypropyl-trimethoxy-silane, gamma-methacryloxypropyl-methyldimethoxysilane, alpha,omega-bis-(aminoalkyl-diethoxysilyl)-polydimethylsiloxanes (Pn=1-7), alpha, omega-bis-(aminoalkyl-diethoxysilyl)-octa-methyltetrasiloxane, 4-amino-3,3-dimethyl-butyl-tri-methoxysilane, and N-ethyl-3-tri-methoxy-silyl-2-methyl-propanamine, 3-(diethyl-aminopropyl)-trimethoxysilane combinations of two or more thereof, and the like. Particularly suitable adhesion promoters include bis(alkyltrialkoxysilyl)amines and tris(alkyltrialkoxysilyl)amines including, but not limited to, bis(3-propyltrimethoxysilyl)amine and tris(3-propyltrimethoxysilyl)amine.

The adhesion promoter may be provided in either the first part or the second part. In one embodiment, the adhesion promoter is provided in the second part (comprising the catalyst). Generally, the adhesion promoter can be provided in an amount of from about 0.05 wt. % to about 10 wt. % based on the total weight of the first part and the second part, from about 0.1 wt. % to about 5 wt. %, from about 0.5 wt. % to about 2.5 wt. %, or from about 1 wt. % to about 2 wt. % based on the total weight of the first part and the second part.

In one embodiment, the composition can include a cure inhibitor to retard the rate of cure. The cure inhibitor can be provided in either the first part or the second part. In one specific embodiment cure inhibitor (E) can contain aliphatic unsaturation. In another specific embodiment, cure inhibitor (E) can have no aliphatic unsaturation. In yet a further embodiment, non-limiting examples of cure inhibitor (E) are selected from the group consisting of diallyl maleate, D-4 vinyl, 2-methyl-3-butene-2-ol, 1-ethynyl-1-cyclohexanol, 3,5-dimethyl-1-hexyn-3-ol and combinations thereof. In one specific embodiment, cure inhibitor (E) is used in an amount specifically of from about 0.02 to about 1 weight percent, more specifically of from about 0.05 to about 0.5 weight percent and most specifically of from about 0.1 to about 0.2 weight percent based on the total weight of the composition.

In one specific embodiment cure inhibitor (E) can be present in any amount to provide for a range of curing temperatures and times, specifically a curing time anywhere from about 10 seconds at about 177 degrees Celsius to about 24 hours at room temperature.

The vulcanizable composition, in one embodiment, can be provided with a low concentration of volatile components. In one embodiment, the composition has a volatile content of about 0.1% or less according to ASTM E595.

In the present compositions, the weight ratio of the first part to second is provided in a ratio of from about 10:0.7 to about 10:1, from about 10:0.75 to about 10:0.95, or from about 10:0.8 to about 10:0.9. According to one specific embodiment of the present invention, the weight ratio of the first part to second part is 10:1. Applicant has found that by mixing at these ratios produces a product that is non-flowable at 0.235 inches (235 mil) or less. It has been surprisingly found that outside of these ratios, the mixture of the first part and the second part does not provide a product that is non-flowable. Without being bound to any particular theory, the first part of the present composition would be expected to drive the majority of the flow/viscosity properties of the system. While the second part has a higher viscosity, it would not be expected to drive the viscosity/flow of the system due to no/low loadings of any effective thixotrope.

In one embodiment, the product produced from curing the mixture of A and B produces a non-flowable product at 0.235 inches or less. In one embodiment, the mixture of the first part and the second part produce a product that is non-flowable from about 0.6 inches to about 0.235 inches (from about 60 mil to about 235 mil). In one embodiment, the mixture produces a product that is non-flowable at least from about 60 mil to about 120 mil.

The first and second parts are typically mixed at 25° C. (room temperature); however, the temperature at which the first and second parts are mixed can vary widely from about 25° C. to 200° C. According to one embodiment of the present invention, the temperature at which the first and second parts are mixed is 25° C.

The first part and the second part can be mixed by any suitable method. A non-flowable product could be achieved by hand mixing. More desirably, mixing is accomplished via a mechanical mixer. The product may be produced by common mixing techniques, in—for example—a mechanical mixer, planetary mixer, Hauschild mixer, Lödige mixer, mixing tube, or an extruder. Mixing may be carried out batchwise or continuously.

The composition can be used in a variety of sealing or adhesive applications including in both horizontal and vertical joints.

EXAMPLES

Example 1

A two part composition was provided with the following parts:

| Part A | |
|---|---|
| Material | Wt. % |
| Silanol-terminated dimethyldiphenylsiloxnae | 49.53 |
| Diatomaceous earth | 10.58 |

-continued

| Part A | |
|---|---|
| Material | Wt. % |
| Red iron oxide | 33.56 |
| Treated fumed silica | 4.02 |
| Ethyl Silicate | 2.11 |
| Water | 0.20 |
| Total | 100 |

| Part B | |
|---|---|
| Material | Wt. % |
| Vinyl-terminated dimethyldiphenylsiloxnae | 56.6 |
| Titanium dioxide | 2 |
| Treated fumed silica | 24 |
| Organo-tin catalyst: tin dimethylneodecanoate | 0.9 |
| Isocyanurate silane | 7.7 |
| Epoxy silane | 8.8 |
| Total | 100 |

Part A and Part B were mixed together using a Speed mixer at 3500 rpm for 10 s twice. The speed and time scale depending on the size of the sample.

Sag is evaluated by evaluating the flow of the resulting product formed from the composition. A multi-notch jig/applicator is provided at one end of a piece of Leneta paper. The applicator is notched to provide stripes of thicknesses of from 14 to 250 mil. About 20 grams of the silicone coating is placed in front of the applicator. The applicator is drawn down across the paper to the opposite end maintaining a straight path. The paper is placed in a vertical position such that the 250 mil stripe (the thickest stripe) is at the top. Sag is observed where any stripe has merged with the stripe below it.

For Example 1, the coating was observed to be non-flowable, i.e., non-sag, from 60 mil to 120 mil.

Comparative Example 1

Comparative example 1 is a product produced from Part A only of Example 1. The catalyst employed in was dibutyl tin dilaurate.

Comparative Example 2

The coating from this composition was prepared from Part A of Example 1 and a tin dimethyl decanoate catalyst. The tin catalyst was not a paste.

Comparative Example 3

The coating for Comparative Example 3 employs Part A from Example 1 and RTV 9950 (available from Momentive Performance Materials Inc.), which is a paste of dibutyl tin diluarate.

Comparative Example 4

The coating for Comparative Example 4 employs RTV 560 available from Momentive Performance Materials Inc with dibutyl tin dilauate.

Comparative Example 5

A composition was prepared as in Example 1 using the same Part B composition except that Part A was provided as follows:

| Part A (Comparative Example 5) | |
| --- | --- |
| Material | wt % |
| Silanol terminated polymer | 53.90 |
| diatomaceous earth | 9.66 |
| red iron oxide | 30.66 |
| Treated fumed silica | 3.67 |
| ethyl silicate | 1.93 |
| water | 0.18 |
| Total | 100.00 |

Example 2

A composition was prepared as in Example 1 with the following Part A and Part B compositions:

| Part A | |
| --- | --- |
| Material | wt % |
| Silanol terminated polymer | 48.88 |
| diatomaceous earth | 10.52 |
| red iron oxide | 33.82 |
| Treated fumed silica | 3.98 |
| ethyl silicate | 2.10 |
| water | 0.20 |
| Silanol inhibitor | 0.50 |
| Total | 100.00 |

| Part B | |
| --- | --- |
| Material | Wt. % |
| Vinyl-terminated dimethyldiphenylsiloxnae | 56.6 |
| Titanium dioxide | 2 |
| Treated fumed silica | 24 |
| Organo-tin catalyst: tin dimethylneodecanoate | 0.9 |
| Isocyanurate silane | 7.7 |
| Epoxy silane | 8.8 |
| Total | 100 |

The silanol inhibitor is a polydimethylsiloxane polymer having a silanol content of about 6.6%.

Sag Testing

Sag is evaluated by evaluating the flow of the resulting product formed from the composition. A multinotch jig/applicator is provided at one end of a piece of Leneta paper. The applicator is notched to provide stripes of thicknesses of from 14 to 250 mil. About 20 grams of the silicone coating is placed in front of the applicator. The applicator is drawn down across the paper to the opposite end maintaining a straight path. The paper is placed in a vertical position such that the 250 mil stripe (the thickest stripe) is at the top. Sag is observed where any stripe has merged with the stripe below it.

Table 1 Shows the Results of the Flow Testing

TABLE 1

| Example | Flow Testing |
| --- | --- |
| 1 | 60-120 mil |
| Comparative Example 1 | Less than 14 mil |
| Comparative Example 2 | 18 mil |
| Comparative Example 3 | 50 mil |
| Comparative Example 4 | Less than 14 mil |
| Comparative Example 5 | 20-40 mil |
| Example 2 | 85-235 mil |

The present composition was able to achieve non-flow, i.e., non-sagging, between 60 and 235 mil. These compositions are capable of being dispensed via high speed mixing/dispensing methods and still have non-sag properties suitable for vertical applications. The present compositions have surprisingly been found to exhibit non-sag properties. Generally, at the mixing ratios employed, it would generally be expected that the first part would drive the majority of the flow or viscosity properties. The second part would generally not be expected to drive the viscosity or flow properties, especially since the components in the first part do not provide appreciable non-sag properties.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a room temperature vulcanizable composition. Modifications may occur to those skilled in the art and to those who may make and use the invention. The disclosed embodiments are merely for illustrative purposes and not intended to limit the scope of the invention or the subject matter set forth in the claims.

What is claimed is:

1. A two-part room temperature vulcanizable composition comprising:
   (a) a first part comprising (i) a polysiloxane polymer having a reactive group, (ii) a filler, and (iii) optionally water; and
   (b) a second part comprising (i) a polysiloxane polymer that may or may not react with a condensation cure silicone system and (ii) a filler and (iii) a tin catalyst, wherein upon mixing and curing the first part with the second part, the composition is non-sagging at from about 70 mil to about 235 mil.

2. The room temperature vulcanizable composition of claim 1, wherein the first part has a viscosity at 25° C. and a shear rate of 10 s$^{-1}$ (plate-plate system, plate diameter 40 mm, gap width 0.5 mm) of from about 30 to about 300 PaS, and the second part has a viscosity at 25° C. and a shear rate of 10 s$^{-1}$ (plate-plate system, plate diameter 40 mm, gap width 0.5 mm) of from about 50 to about 300 PaS.

3. The room temperature vulcanizable composition of claim 1, wherein the tin catalyst comprises a mixture of silica and a tin compound.

4. The room temperature vulcanizable composition of claim 3, wherein the tin compound is selected from a dialkyltin dicarboxylate.

5. The room temperature vulcanizable composition of claim 3, wherein the tin compound is present in an amount of from about 0.1 weight percent to about 6 weight percent based on the total weight of the second part.

6. The room temperature vulcanizable composition of claim 1, wherein the polymer siloxane (i) of the first part is a silanol-terminated polysiloxane.

7. The room temperature vulcanizable composition of any of claim 6, wherein the silanol-terminated polysiloxane silanol-terminated is a diorganopolysiloxane polymer of the formula:

$$M^1_a D^1_b D^2_c$$

$M^1$ is $(HO)_{3-x-y}R^1_x R^2_y SiO_{1/2}$
$D^1=R^3 R^4 SiO_{2/2}$
$D^2=R^5 R^6 SiO_{2/2}$
where $R^1$ and $R^2$ are independently chosen monovalent hydrocarbon radicals up to about 60 carbon atoms;
$R^3$ and $R^4$ are independently chosen monovalent hydrocarbon radicals of up to about 60 carbon atoms; where $R^5$ and $R^6$ are independently chosen monovalent hydrocarbon radicals of up to about 60 carbon atoms;
a is 2, b is equal to or greater than 1, c zero or positive integer, x is 0, 1, or 2, and y is either 0 or 1, subject to the limitation that x+y is less than or equal to 2.

8. The room temperature vulcanizable composition of claim 6, wherein the silanol-terminated polysiloxane is a dimethyldiphenylpolysiloxane.

9. The room temperature vulcanizable composition of claim 1, wherein the polysiloxane polymer (i) of the second part is an alkenyl-terminated polysiloxane.

10. The room temperature vulcanizable composition of claim 1, wherein the polysiloxane polymer (i) of the second part is a vinyl-terminated polysiloxane.

11. The room temperature vulcanizable composition of claim 1, wherein the polysiloxane (i) of the second part is of the formula:

$$M^2_d D^3_e D^4_f$$

$M^2=(R^{11})(R^{12})(R^{13})SiO_{1/2}$;
$D^3=R^{14}R^{15}SiO_{2/2}$;
$D^4=R^{16}R^{17}SiO_{2/2}$;
where $R^{11}$, $R^{12}$, and $R^{13}$ are independently chosen from a hydrocarbon up to about 60 carbon atoms and can have a reactive or an unreactive group;
$R^{14}$ and $R^{15}$ are independently chosen from a hydrocarbon of up to about 60 carbon atoms;
$R^{16}$ and $R^{17}$ are independently chosen from a hydrocarbon of up to about 60 carbon atoms;
subscript d is 2, e is equal to or greater than 1, and f is zero or a positive integer;
at least one of $R^{11}$, $R^{12}$, $R^{13}$, $R^{14}$, $R^{15}$, $R^{16}$, and $R^{17}$ is a optionally substituted with a reactive group or an unreactive group.

12. The room temperature vulcanizable composition of claim 11, wherein at least one of $R^{11}$, $R^{12}$, $R^{13}$, $R^{14}$, $R^{15}$, $R^{16}$, and $R^{17}$ is an alkenyl functional group.

13. The room temperature vulcanizable composition of claim 1, wherein the filler is present in an amount of from about 35 wt. % to about 60 wt. % based on the total weight of the vulcanizable composition.

14. The room temperature vulcanizable composition of claim 1 further comprising a silanol functional polyorganosiloxane having a silanol content of at least about 5% by weight based on the weight of the silanol functional polyorganosiloxane.

15. The room temperature vulcanizable composition of claim 14, wherein the silanol functional polyorganosiloxane is of the formula:

$$M^3_g D^5_h D^6_i$$

$M^3=(R^{18})(R^{19})(R^{20})SiO_{1/2}$;
$D^5=R^{21}R^{22}SiO_{2/2}$;
$D^6=R^{23}R^{24}SiO_{2/2}$;
where $R^{18}$, $R^{19}$, $R^{20}$, $R^{21}$, $R^{22}$, $R^{23}$, and $R^{24}$ are independently chosen from a hydrocarbon of up to about 60 carbon atoms, and a hydroxyl group;
subscript g is 2, h is equal to or greater than 1, and i is zero or a positive integer; and the silanol functional polyorganosiloxane has a silanol content of at least 5%.

16. The room temperature vulcanizable composition of claim 15, wherein h+i is from about 5 to about 2,500.

17. The room temperature vulcanizable composition of claim 14, wherein the silanol functional polyorganosiloxane has a silanol content of from about 5% to about 10% based on the weight of the silanol functional polyorganosiloxane.

18. The room temperature vulcanizable composition of claim 14, wherein the silanol functional polyorganosiloxane is present in the first or second part and is present in an amount of from about 0.05 wt. % to about 1 wt. % based on the total weight of the part to which it is added.

19. The room temperature vulcanizable composition of claim 14, wherein the silanol functional polyorganosiloxane is present in the first part.

20. The room temperature vulcanizable composition of claim 1, wherein the ratio of the first part to the second part is from about 10:0.7 to about 10:1 by weight.

21. The room temperature vulcanizable composition of claim 1, wherein the ratio of the first part to the second part is from about 10:0.75 to about 10:0.95 by weight.

22. A cured material formed from a mixture of the room temperature vulcanizable composition of claim 1.

23. A method of treating a surface comprising applying a mixture of the first part and the second part of the two-part vulcanizable composition of claim 1 to a surface of a substrate.

24. The method of claim 23, wherein the ratio of the first part to the second part is from about 10:0.7 to about 10:1 by weight.

25. The method of claim 23, wherein the ratio of the first part to the second part is from about 10:0.75 to about 10:0.95 by weight.

26. The room temperature vulcanizable composition of claim 1, wherein the first part (a) comprises a crosslinker selected from an alkoxysilane, an alkoxysiloxane, an oximosilane, an oximosiloxane, an enoxysilane, an enoxysiloxane, an aminosilane, an aminosiloxane, a carboxysilane, a carboxysiloxane, an alkylamidosilane, an alkylamidosiloxane, an arylamidosilane, an arylamidosiloxane, an alkoxyaminosilane, an alkylarylaminosiloxane, an alkoxycarbamatosilane, an alkoxycarbamatosiloxane, an imidatosilane, a ureidosilane, an isocyanatosilane, a isothiocyanatosilane, or a combination of two or ore thereof.

27. A two-part room temperature vulcanizable composition comprising:
(a) a first part comprising (i) a polysiloxane polymer having a reactive group, (ii) a filler, and (iii) optionally water, the first part having a viscosity at 25° C. and a shear rate of 10 s$^{-1}$ (plate-plate system, plate diameter 40 mm, gap width 0.5 mm) of from about 30 to about 300 PaS; and (b) a second part comprising (i) a polysiloxane polymer that may or may not react with a condensation cure silicone system and (ii) a filler and (iii) a tin catalyst, the second part having a viscosity at 25° C. and a shear rate of 10 s$^{-1}$ (plate-plate system, plate diameter 40 mm, gap width 0.5 mm) of from about 50 to about 300 PaS;

wherein the ratio of the first part to the second part is from about 10:0.7 to about 10:1 by weight, and upon mixing and curing the first part with the second part, the composition is non-sagging at from about 70 mil to about 235 mil.

28. A two-part room temperature vulcanizable composition comprising:

(a) a first part comprising (i) a polysiloxane polymer having a reactive group, (ii) a filler, and (iii) optionally water, the first part having a viscosity at 25° C. and a shear rate of 10 s$^{-1}$ (plate-plate system, plate diameter 40 mm, gap width 0.5 mm) of from about 30 to about 300 PaS; and (b) a second part comprising (i) a polysiloxane polymer that may or may not react with a condensation cure silicone system and (ii) a filler and (iii) a tin catalyst comprising a mixture of silica and a tin compound, the tin compound being present in an amount of from about 0.1 weight percent to about 6 weight percent based on the total weight of the second part, the second part having a viscosity at 25° C. and a shear rate of 10 s$^{-1}$ (plate-plate system, plate diameter 40 mm, gap width 0.5 mm) of from about 50 to about 300 PaS wherein the ratio of the first part to the second part is from about 10:0.7 to about 10:1 by weight, and upon mixing and curing the first part with the second part, the composition is non-sagging at from about 70 mil to about 235 mil.

\* \* \* \* \*